US009544682B2

(12) United States Patent
Nguyen et al.

(10) Patent No.: US 9,544,682 B2
(45) Date of Patent: Jan. 10, 2017

(54) APPARATUS, METHOD AND ARTICLE FOR PROVIDING AUDIO OF DIFFERENT PROGRAMS

(71) Applicant: EchoStar Technologies L.L.C., Englewood, CO (US)

(72) Inventors: Phuc H. Nguyen, Parker, CO (US); Christopher William Bruhn, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 725 days.

(21) Appl. No.: 13/910,804

(22) Filed: Jun. 5, 2013

(65) Prior Publication Data
US 2014/0362201 A1    Dec. 11, 2014

(51) Int. Cl.
| | |
|---|---|
| *H04N 9/47* | (2006.01) |
| *H04N 7/18* | (2006.01) |
| *H04R 3/00* | (2006.01) |
| *G06K 9/00* | (2006.01) |
| *H04R 3/12* | (2006.01) |
| *H04R 27/00* | (2006.01) |
| *H04R 5/033* | (2006.01) |

(52) U.S. Cl.
CPC ............. *H04R 3/00* (2013.01); *G06K 9/00604* (2013.01); *H04R 3/12* (2013.01); *H04R 27/00* (2013.01); *H04R 5/033* (2013.01); *H04R 2227/003* (2013.01); *H04R 2420/01* (2013.01); *H04R 2420/07* (2013.01)

(58) Field of Classification Search
CPC ..................... G06K 9/00604; H04R 2227/003; H04R 2420/01; H04R 2420/07; H04R 27/00; H04R 3/00; H04R 3/12; H04R 5/033
USPC .......................................................... 348/78
See application file for complete search history.

(56) References Cited

U.S. PATENT DOCUMENTS

| | | | |
|---|---|---|---|
| 5,596,647 A | 1/1997 | Wakai et al. | |
| 7,519,196 B2* | 4/2009 | Bech ...................... | H04R 1/105 381/370 |
| 2011/0076657 A1* | 3/2011 | Forest ................... | G06Q 10/10 434/252 |
| 2012/0146891 A1* | 6/2012 | Kalinli ................... | H04N 19/33 345/156 |
| 2013/0201305 A1* | 8/2013 | Sibecas ............ | H04N 21/42201 348/54 |
| 2014/0161412 A1* | 6/2014 | Chase ......................... | 386/224 |
| 2014/0181910 A1* | 6/2014 | Fingal ................... | H04L 63/107 726/4 |
| 2014/0328505 A1* | 11/2014 | Heinemann ............. | H04S 7/303 381/303 |

(Continued)

Primary Examiner — Jessica M Prince
(74) Attorney, Agent, or Firm — Seed IP Law Group LLP

(57) ABSTRACT

A system enables two different users to independently view and listen to two completely different programs being displayed concurrently on the same display (e.g., in a split screen mode), or on multiple displays that are visible by different users, by sending the audio signal of one of the programs being displayed to the headphone device of the user currently looking at that program being displayed on the display. In one embodiment, the headphone device includes a camera mounted on the headphone device that is positioned to detect and/or track eye movements/positions or other movements of the user wearing the headphone device to determine which program that user is currently looking at.

18 Claims, 14 Drawing Sheets

(56) References Cited

U.S. PATENT DOCUMENTS

2015/0253937 A1\* 9/2015 Kim ...................... G06F 3/0488
715/765

\* cited by examiner

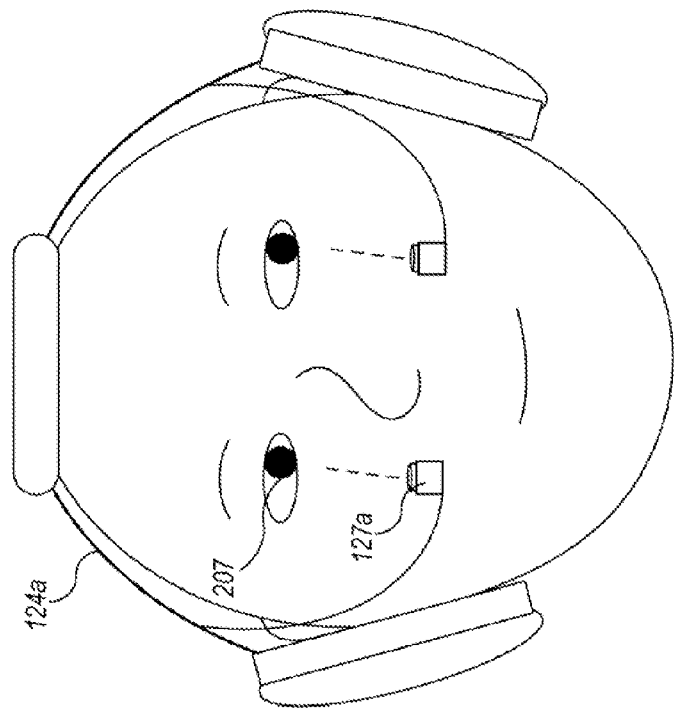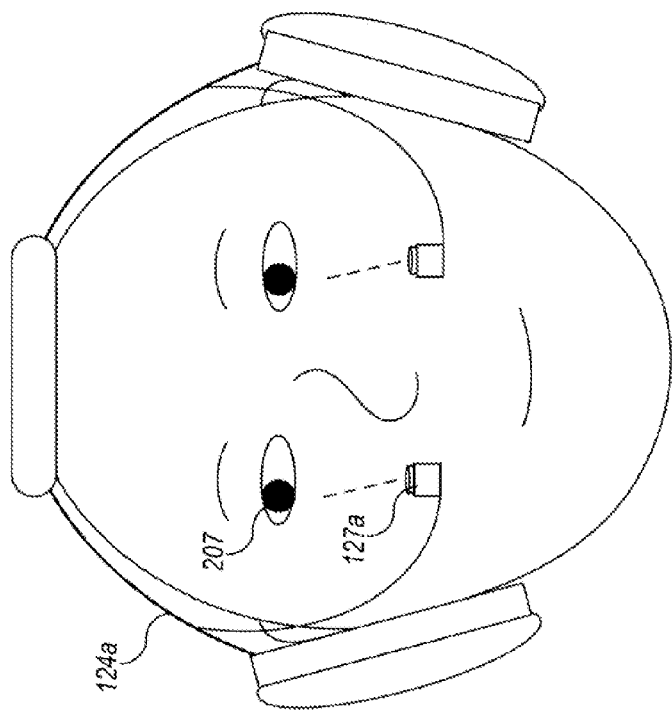
Fig. 3

APPARATUS, METHOD AND ARTICLE FOR PROVIDING AUDIO OF DIFFERENT PROGRAMS

TECHNICAL FIELD

The present disclosure generally relates to providing audio, and more particularly to providing audio of different programs.

BRIEF SUMMARY

In one example embodiment, the system enables two different users to independently view and listen to two completely different programs being displayed concurrently on the same display (e.g., in a split screen mode), or on multiple displays that are visible by different users, by sending the audio signal of one of the programs being displayed to the headphone device of the user currently looking at that program being displayed on the display. In one embodiment, the headphone device includes a camera mounted on the headphone that is positioned to detect and/or track eye movements/positions of the user wearing the headphone device to determine which program that user is currently looking at. When the user looks at the other program being displayed on the display, the system will switch to sending the audio signal of that other program to the user's headphone device.

In another embodiment, the camera may be connected to a receiving device or media player device that generates the program for display and/or audio signal and is positioned such that the current direction the user is looking may be determined. This may include the camera capturing information indicative of one or more of: a position of the user's head, a position of the user's eyes, a direction in which the user's eyes are looking, movements of the user, movements of the user's eyes and gestures of the user.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are enlarged and positioned to improve drawing legibility and understanding of the features. Further, the particular shapes of the elements as drawn are not intended to convey any information regarding the actual shape of the particular elements, and have been solely selected for ease of recognition in the drawings.

FIG. 3 a diagram illustrating tracking of eye movements/positions using one or more cameras of a headphone device in a system for providing audio of different programs, according to one non-limiting illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with devices, cameras and systems for tracking eye movements, body movements and gestures have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the embodiments.

Figure 1:
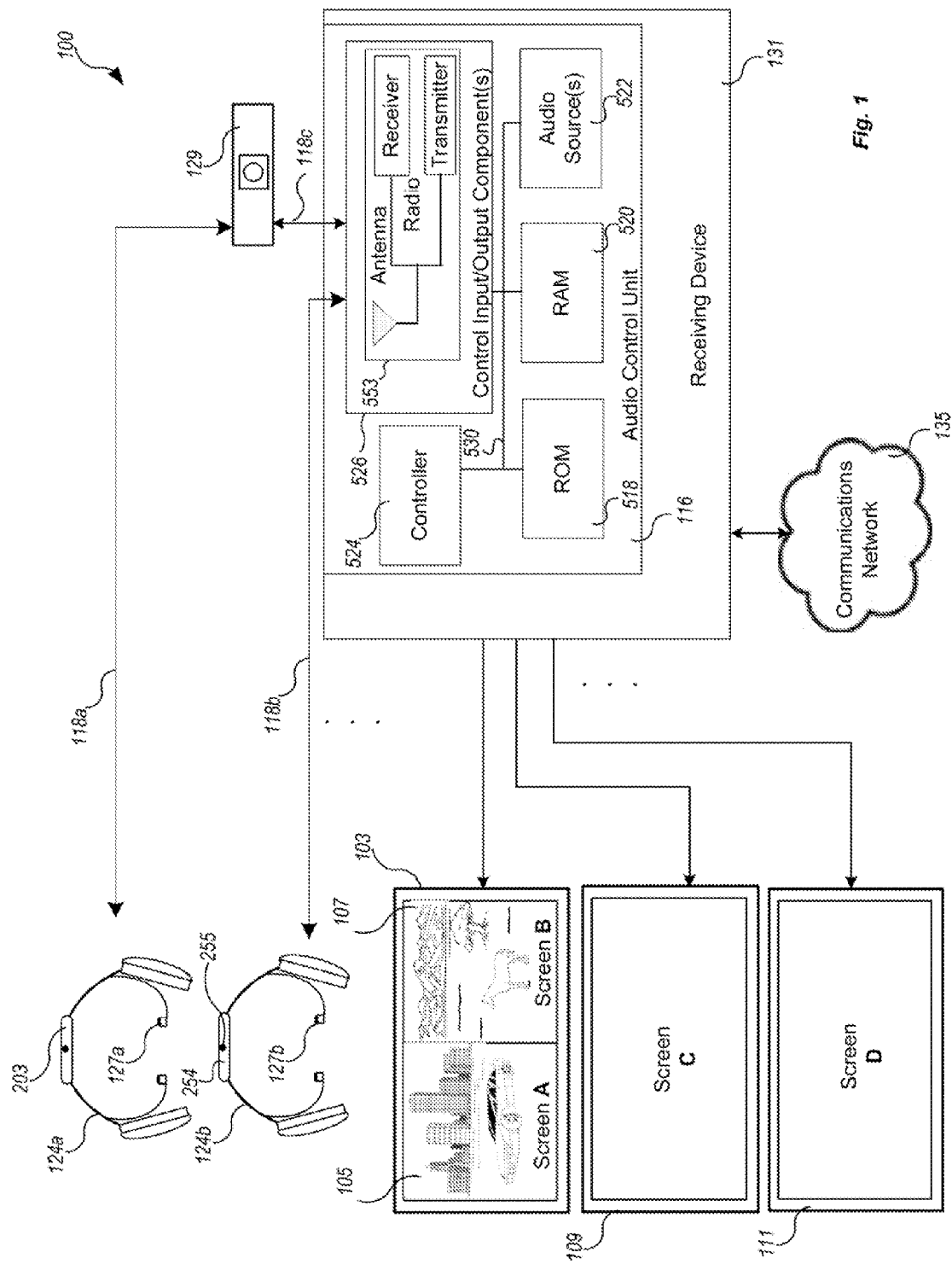
FIG. 1 is a diagram of a system for providing audio of different programs, according to one non-limiting illustrated embodiment.

FIG. 1 is a diagram of a system 100 for providing audio of different programs, according to one non-limiting illustrated embodiment. Systems, processes and techniques are provided for two or more different users to independently view and listen to two or more completely different programs 105 and 107 being displayed concurrently on the same display 103 (e.g., in a split screen mode), or on multiple displays 109 and 111 that are visible by different users. For example, this may be performed by sending the audio signal via communication link or channel 118a or 118b of one of the programs being displayed to the corresponding headphone device 124a or 124b of the user currently looking at that program on the display 103. For example, in one embodiment, the audio signal sent via communication link or channel 118a is carrying the audio stream of the program the user of headphone device 124a is looking at and the audio signal sent via the communication link or channel 118b is carrying the audio stream of the program the user of headphone device 124b is looking at.

In one embodiment, the headphone device 124a and/or 124b includes at least one camera 127a or 127b mounted on the corresponding headphone device 124a or 124b that is positioned to detect and/or track eye movements and/or eye positions of the user wearing the headphone device 124a or 124b to determine which program the user wearing the corresponding headphone device 124a or 124b is currently looking at. When the user looks at the other program being displayed on the display 103 (or display 109 or 111 visible by the user), the system will detect the user switched to looking at the other program and then switch to sending the audio signal of that other program to the user's headphone device 124a or 124b. Headphone device 124a has a controller 203 and headphone device 124b has a controller 254 to process and act on input signals to their respective headphone devices 124a and 124b to facilitate implementation of the above processes.

The receiving device 131 may be in operable communication with a communications network 135. Program content (i.e., a program including or not including advertisements), may be communicated from a program distributor or content provider through suitable communication media, generally illustrated as communications network 135 for convenience. Communications network 135 may include many different types of communication media including those utilized by various different physical and logical channels of communication, now known or later developed. Non-limiting media and communication channel examples include one or more, or any operable combination of: telephone systems, the Internet, cable systems, fiber optic systems, microwave systems, asynchronous transfer mode ("ATM") systems, frame relay systems, digital subscriber line ("DSL") systems, radio frequency ("RF") systems, cellular systems, and satellite systems.

In various example embodiments, the receiving device may be, but is not limited to: a "television converter," a "receiver," a "set-top box," a "television receiving device," a "television receiver," a "television recording device," a "satellite set-top box," a "satellite receiver," a "cable set-top box," a "cable receiver," a "media player," and/or a "television tuner." Accordingly, the receiving device may be any suitable converter device or electronic equipment that is operable to receive programming. Further, the receiving device may itself include user interface devices, such as buttons or switches. However, In some embodiments, the receiving device 131 may be a recording device or other media player that outputs program content that has not been received by the receiving device 131 via communications network 135 and, in some embodiments, need not have functionality to receive program content from some or all external sources.

In some embodiments, the audio signal may instead or also be sent to and/or through other devices over various networks, channels and/or signal paths, such as via corresponding communication channels 118a, 118b and/or 118c and/or via communications network 135. For example, instead of or in addition to sending the audio signal of the program that the user is currently looking at to the headphone device of the user (e.g., headphone device 124a), the audio signal of the program the user is currently looking at may be sent to one or more other devices of the user, including, but not limited to, one or more of: a smartphone device, a tablet device, a mobile computing device, a computer, a speaker system, an entertainment system, a game console, a gaming device, a virtual reality system, etc. This audio signal may be sent via a communication channel such as corresponding communication channels 118a and/or 118b and/or via communications network 135 which may connect to a remote system. As another example, in an embodiment where there is only a single user detected by the camera device 129, receiving device 131 or other device, the audio stream may instead or also be sent to the normal non-headphone device speakers (not shown) of the system 100 and/or to another device of the user, including, but not limited to, one or more of: a smartphone device, a tablet device, a mobile computing device, a computer, a speaker system, an entertainment system, a game console, a gaming device, a virtual reality system, etc.

The receiving device 131 may include a controller 524, control input and output components 526, read only memory 518, random access memory 520 and program audio sources 522 to enable the system to provide the different audio sources according to which program the user is currently looking at. The controller 524 of the audio control unit 116 and the headphone device controller 203 may be a microprocessor, microcontroller, programmable logic controller (PLC), programmable gate array (PGA), application specific integrated circuit (ASIC) or another controller capable of sending signals to various outputs (including the control input and output components 526), performing logical operations, and sending signals to various other components. Typically, the controller 524 may take the form of a microprocessor (e.g., x86, MIPS, ARM, etc.). As shown, the audio control unit 116 may also include one or more non-transitory processor- or computer-readable storage media, for example read only ROM 518 and RAM 520. The non-transitory processor- or computer-readable storage media 518 and 520 may be in addition to any non-transitory storage medium (e.g., registers) which is part of the controller 524. As shown, the audio control unit 116 may also include one or more buses 530 (only one illustrated) coupling various components together, for example one or more power buses, instruction buses, data buses, etc.

As illustrated, the ROM 518 and RAM 520 store instructions and/or data or values for variables or parameters. The sets of data may take a variety of forms, for example a lookup table, a set of records in a database, etc. The instructions and sets of data or values are executable by the controller 524. Execution of such causes the controller 524 to perform specific acts to cause the selection, generating and/or transmitting of a first electrical or other electromagnetic signal representing audio associated with the first program 105 and selection, generating and/or transmitting of a second electrical or other electromagnetic signal representing audio associated with the second program 107. Such selection, generating and/or transmitting of additional audio signals may also be performed. In some embodiments, the first electrical signal and second electrical signal are encoded individually into one signal. Also, one or both of the first electrical signal and the second electrical signal may be a wireless signal.

Execution of instructions by the controller 524 may also cause the controller 524 to perform specific acts to cause the audio control unit 116 to receive, format, interpret, process and/or make decisions regarding received information indicative of one or more of: a position of the user's head, a position of the user's eyes, a user's gaze, a direction in which the user's eyes are looking, movements of the user, movements of the user's eyes, gestures of the user, facial features identifying a particular user or users, facial recognition, user profile information, etc. For example, such data may be received via the wired or wireless communication channels or links 118a, 118b and/or 118c between the audio control unit 116, the headphone devices 124a, 124b, and/or the camera device 129. In some embodiments, execution of instructions by the controller 524 may cause the controller 524 to perform specific acts to cause the audio control unit 116 to determine which program the viewer wearing a headphone device (e.g., headphone device 124a) is currently looking at. When the user looks at a particular program being displayed on the display 103 (or display 109 or 111 visible by the user), the execution of instructions by the controller 524 may cause the controller 524 to switch to select the audio signal of that particular program and send the audio signal of that particular program to the headphone device 124a via communication channel 118a from the control input and output component(s) 526 of the audio control unit 116.

The audio control unit 116 may include one or more radio transceiver devices such as radio transceiver device 553 to receive and send wireless signals of communication channels 118a, 118b and/or 118c, and/or receive and send wireless signals between audio control unit 116 and communications network 135. In some embodiments, the radio transceiver device 553 may be located outside the audio control unit 116 or receiving device 131, but is in operable communication with the audio control unit 116 and/or receiving device 131. In the example embodiment shown in FIG. 1, communication channel 118a is between the control input and output component(s) 526 of the audio control unit 116 and headphone device 124a. However, the communication channels 118a and 118b may include active and/or passive communication channels or segments between and/or through any of the devices and/or components shown in FIG. 1 and the corresponding headphone device 124a or 124b in order to communicate applicable information between such devices. For example, communication channel 118c is shown in FIG. 1 as being between input and output component(s) 526 of the audio control unit 116 and the camera device 129, and communication channel 118a is shown as being between the camera device 129 and the headphone device 124a.

The audio control unit 116 may also perform an initialization and/or calibration process with the camera device 129 alone or in conjunction with the headphone devices 124a and 124b. For example, when a camera device external to the headphone devices 124a and 124b is used to detect movement of one or more users' eyes or other gestures of one or more users, an initialization or calibration process may include the user wearing a particular headphone device (e.g., headphone device 124b) and causing the headphone device 124b to be identified by the audio control unit 116 by use of an identifier of the headphone device 124b being communicated from the headphone device 124b. This identifier may be communicated via wired or wireless communication channel 118b (or other wired or wireless communication channel, such as those described herein) to the control input output component(s) 526 of the audio control unit 116 and/or the external camera device 129. For example, this may be communicated via an infrared (IR) or other radio frequency (RF) or electromagnetic signal modulated to communicate the identifier of the headphone device 124b from the headphone unit 124b to the control input output component(s) 526 of the audio control unit 116 and/or the external camera device 129. In one embodiment, the receiving device 131 and/or headphone device controller (e.g., headphone device controller 254 of headphone device 124b) assigns a unique frequency/modulation to an IR light emitting diode (LED) built into the headphone device 124b, (such as LED 255) upon pairing with the audio control unit 116. Then the video camera 129 identifies the headphone device 124b based on seeing this unique frequency/modulation. In another embodiment, users may assign their headphone devices 124a and 124b to their profiles so that facial recognition systems can be used by the camera 129 and/or audio control unit 116 to identify the headphone device based on the user wearing that device.

Once the headphone device 124b is identified by the audio control unit 116, an initialization or calibration process may be performed in which the user wearing the headphone device 124b is prompted on one or more of the display devices 103, 109 and/or 111, or via audio transmitted to or generated by the headphone device 124b, to look at a particular location on the screen of the display 103, 109 or 111. The user may then indicate with a remote control device or via an input module on the headphone device 124b that the user is looking at the particular location on the screen of the display (e.g. display 103). The current direction or position of the user's eye captured by the camera 127b and/or 129 will be associated with the user looking at the particular location on the screen. Also, this current direction the user's eye is facing or position of the user's eye captured by the camera 127b and/or 129 may also be associated with a current position and/or position of the headphone device 124b (and thus a position and/or position of the user's head), gesture of the user, and/or location of the user, when the user is looking at that location on the display 103. Alternatively, information indicative of the current position of the headphone device 124b (and thus a position and/or position of the user's head), gesture of the user, and/or location of the user may be used independently of or instead of the current direction the user's eye is facing or position of the user's eye to determine which display or location on a display the user is looking at. This initialization/calibration may be repeated for various other locations on the display(s) and at various times for increased accuracy and precision in determining which location on a display the user wearing headphone device 124b is currently looking at. For example, this initialization/calibration may be performed each time it is determined that the user has moved locations, or moved over a threshold amount. The calibration data may also be stored for subsequent use.

Determining the current position of the user's eyes, tracking eye movement, tracking gaze of a user, determining the current position and/or location of the headphone device 124b (and thus a position and/or location of the head of the user wearing the headphone device 124b), and/or determining which display 103, 109 and/or 111, or location on the display 103, 109 and/or 111, the user is currently looking at may be performed in a variety of manners. These may include, but are not limited to: utilization of an accelerometer and/or gyroscope in the headphone device 124b (e.g., located in the headphone device controller 203); use of eye, head and/or motion tracking devices and systems on or in conjunction with the headphone device 124b such as, for example, the iView X™ Hi-Speed, iView X™ RED, iView X™ HED, and/or X™ Hi-Speed Primate systems, and/or components thereof; other eye & gaze tracking systems or the like; global positioning systems (GPS); motion sensors; beacons, etc. Such eye, gaze, head and/or motion tracking devices, or applicable components thereof, may also or instead be utilized on, in or in conjunction with, the audio control unit 116; display 103, 109 and/or 111; external camera 129 and/or receiving device 131; other eye & gaze tracking systems or the like; global positioning systems (GPS); motion sensors; beacons, etc.

The controller 524 of the audio control unit 116 may use RAM 520 in a conventional fashion, for volatile storage of instructions, data, etc. The controller 524 may store data indicative of, or otherwise regarding a direction the user is currently looking at; a particular display 103, 109, or 111, and/or a location on a particular display 103, 109, or 111 the user is currently looking at; data corresponding to the particular configurations of the headphone devices 124a and 124b; configuration data related to the display 103, 109, and/or 111; the codec of the audio sources 522; and/or audio data or signals associated with programs being displayed on screen A 105, screen B 107, Screen C and/or Screen D, etc. The audio sources 522 include graphics circuitry and/or instructions stored on a computer readable medium to encode/decode or otherwise generate, select and/or communicate audio signals in the manners described herein.

For example, the control input and output components 526 are configured to control the transmitting of the first electrical signal representing audio associated with the program 103 and transmitting of a second electrical signal representing audio associated with the program 105 at any given time and, in some embodiments, to also send and receive control signals and data to be received by wireless receivers and/or transceivers (e.g., located in the headphone device control unit 203), and/or located in the camera device 129. In some embodiments, the camera device 129 may be located or connected to other devices including, but not limited to: display device 103, 109 and/or 111; receiving device 131; audio control unit 116; a mobile device (not shown); a smart phone (not shown); a tablet device (not shown); other personal computing devices; smart appliances; etc.

The output components 526 may be those configured to send signals via communication channels or links 118a, 118b and/or 118c. Such signals may include, may use or may be based on, but are not limited to, one or more of: an infrared (IR) signal, consumer electronics infrared protocols, RC-5 IR protocol, RC-6 IR protocol, the R-Step IR protocol, NEC TC101 IR protocol, a radio frequency (RF) or other electromagnetic signal, a Digital Light Processing Link (DLP® Link) signal, a IEEE 802.15.4 ("ZIGBEE"), a "RUBEE" wireless protocol, a wireless local area network (WLAN), IEEE 802.15.1 ("BLUETOOTH"), IEEE 802.11 ("WI-FI"), a High-Definition Multimedia Interface (HDMI) Consumer Electronics Control (CEC) signal, personal area network(s), etc.

Figure 10:
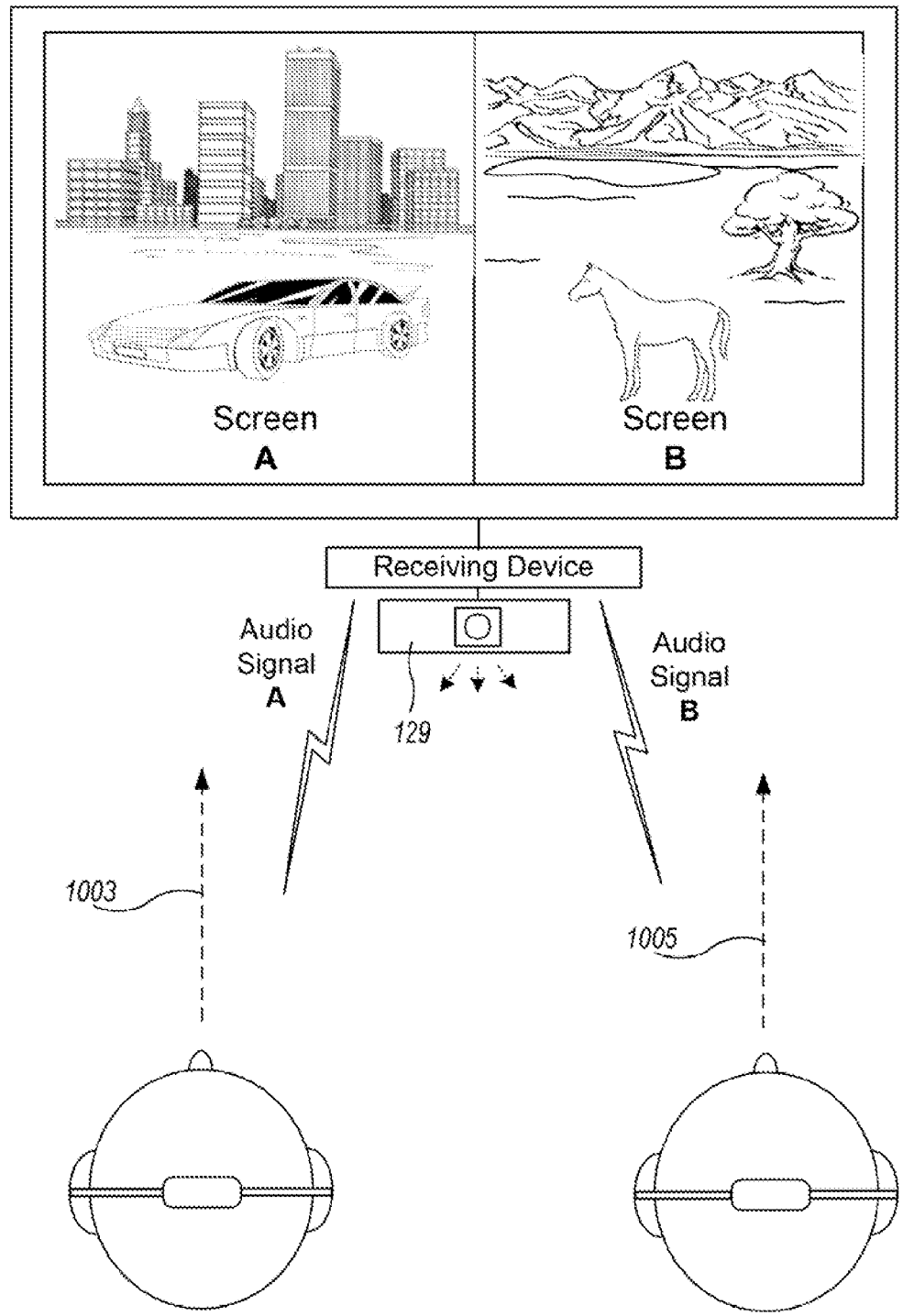
FIG. 10 is a diagram of two different programs being concurrently displayed on one display visible by two users and selection of audio signals to be transmitted to headphone devices of the users looking at different programs based on a camera in communication with a receiving device capturing user actions in a system for providing audio of different programs, according to one non-limiting illustrated embodiment.
Figure 11:
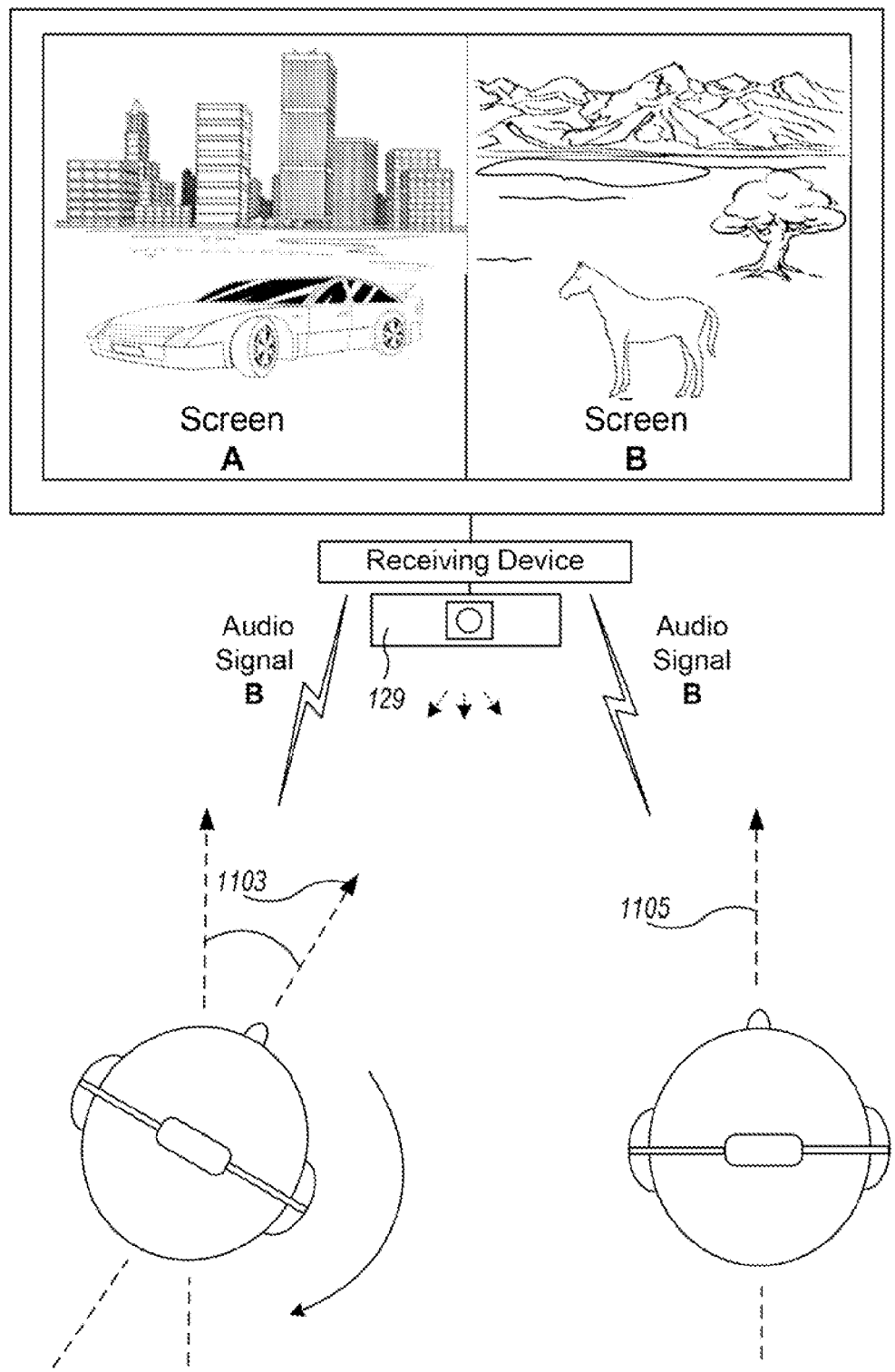
FIG. 11 is a diagram of two different programs being concurrently displayed on one display visible by two users and selection of audio signals to be transmitted to headphone devices of the users looking at different programs based on a camera in communication with a receiving device capturing head movements in a system for providing audio of different programs, according to one non-limiting illustrated embodiment.

In some embodiments, the camera device 129 may be connected to receiving device 131 or other media player device that generates one or more program signals for display on screen A 105, screen B 107, Screen C and/or Screen D and/or audio signal and is positioned in view of the user such that the current direction the user is looking may be determined (e.g., see FIGS. 10 and 11 which illustrate some examples according to this embodiment). This may include the camera 129 capturing information indicative of one or more of: a position of the user's head, a position of the user's eyes, a direction in which the user's eyes are looking, movements of the user, movements of the user's eyes and gestures of the user.

Figure 2:
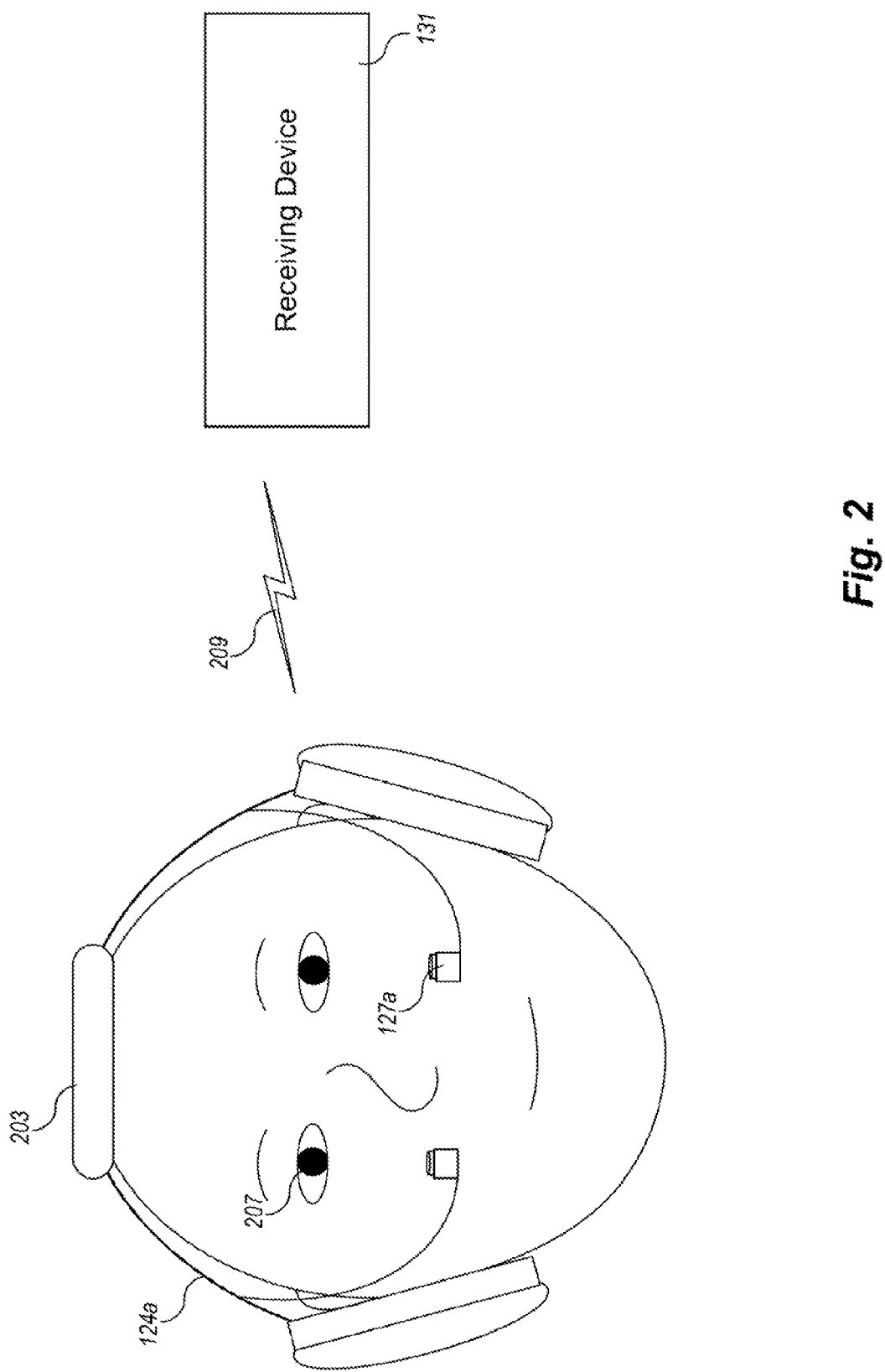
FIG. 2 is a diagram of an example headphone device in communication with a receiving device in a system for providing audio of different programs, according to one non-limiting illustrated embodiment.

FIG. 2 is a diagram of an example headphone device 124a in communication with a receiving device 131 in a system for providing audio of different programs, according to one non-limiting illustrated embodiment. In one embodiment, a controller 203 of the headphone device 124a includes at least one computer processor that generates input indicative of which program the user is currently looking at of a plurality of programs concurrently being displayed on one or more displays visible by the user by at least associating a position of an eye 207 of the user with a location on a display associated with one of the plurality of programs being displayed on the location. The controller 203 of the headphone device 124a may communicate the input indicative of which program the user is currently looking at over a wireless signal 209 such as over a Bluetooth® or other wireless signal.

FIG. 3 a diagram illustrating tracking of eye movements using at least one camera 127a of a headphone device 124a in a system for providing audio of different programs, according to one non-limiting illustrated embodiment. As shown, when the eye 207 moves one direction or another, camera 207 captures this movement and provides data indicative of the direction the eye is looking or pointed, or otherwise provides data indicative of the position of the eye 207. Such information regarding the eye movements and/or position of the eye of the user may be communicated from the controller 203 of the headphone device 124a over communication link or channel 118a to the audio control unit 116 of the receiving device 131 (shown in FIG. 1). In various embodiments, the receiving device 131 may receive, format, interpret, process and/or make decisions regarding received information indicative of one or more of: a position of the user's eyes, a user's gaze, a direction in which the user's eyes are looking, a position of the user's head, movements of the user, movements of the user's eyes, gestures of the user, facial features identifying a particular user or users, facial recognition, user profile information, etc. Such data may be received via the wired or wireless communication channels or links 118a, 118b and/or 118c between the audio control unit 116, the headphone devices 124a 124b, and/or the camera device 129. In some embodiments, execution of instructions by the controller 524 may cause the controller 524 to perform specific acts to cause the audio control unit 116 to determine which program the viewer wearing a headphone device (e.g., headphone device 124a) is currently looking at. When the user looks at a particular program being displayed on the display 103 (or display 109 or 111 visible by the user) as shown in FIG. 1, the execution of instructions by the controller 524 may cause the controller 524 to switch to select the audio signal of that particular program and send the audio signal of that particular program to the headphone device 124a via communication channel 118a from the control input and output component(s) 526 of the audio control unit 116.

Figure 4:
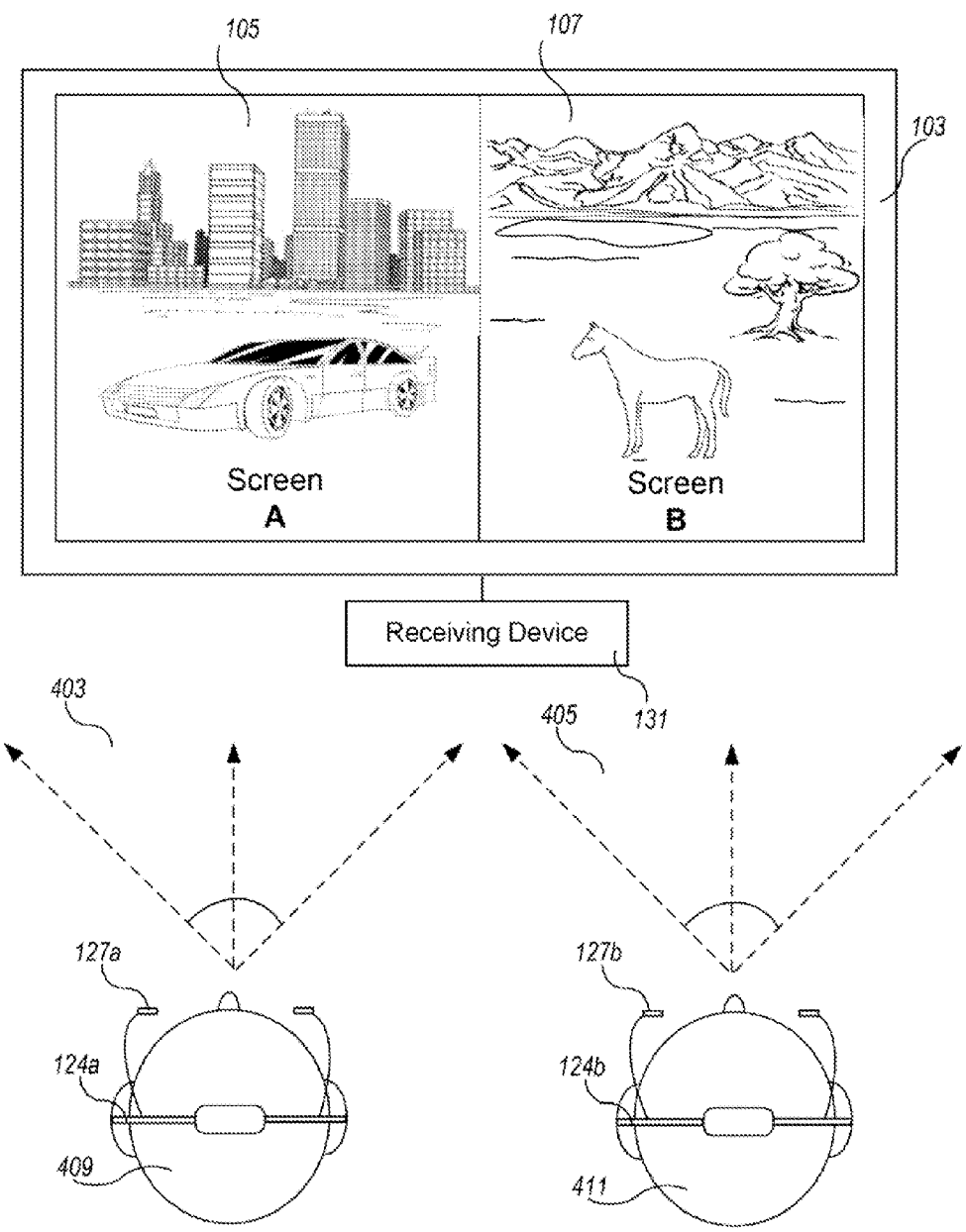
FIG. 4 is a diagram of two different programs being displayed on a display in a system for providing audio of different programs, according to one non-limiting illustrated embodiment.

FIG. 4 is a diagram of two different programs 105 and 107 being displayed on a display 103 in a system for providing audio of different programs, according to one non-limiting illustrated embodiment. As shown, the corresponding cameras 127a and 127b of headphone devices 124a and 124b track corresponding eye movements 403 and 405 of each user 409 and 411.

Figure 5:
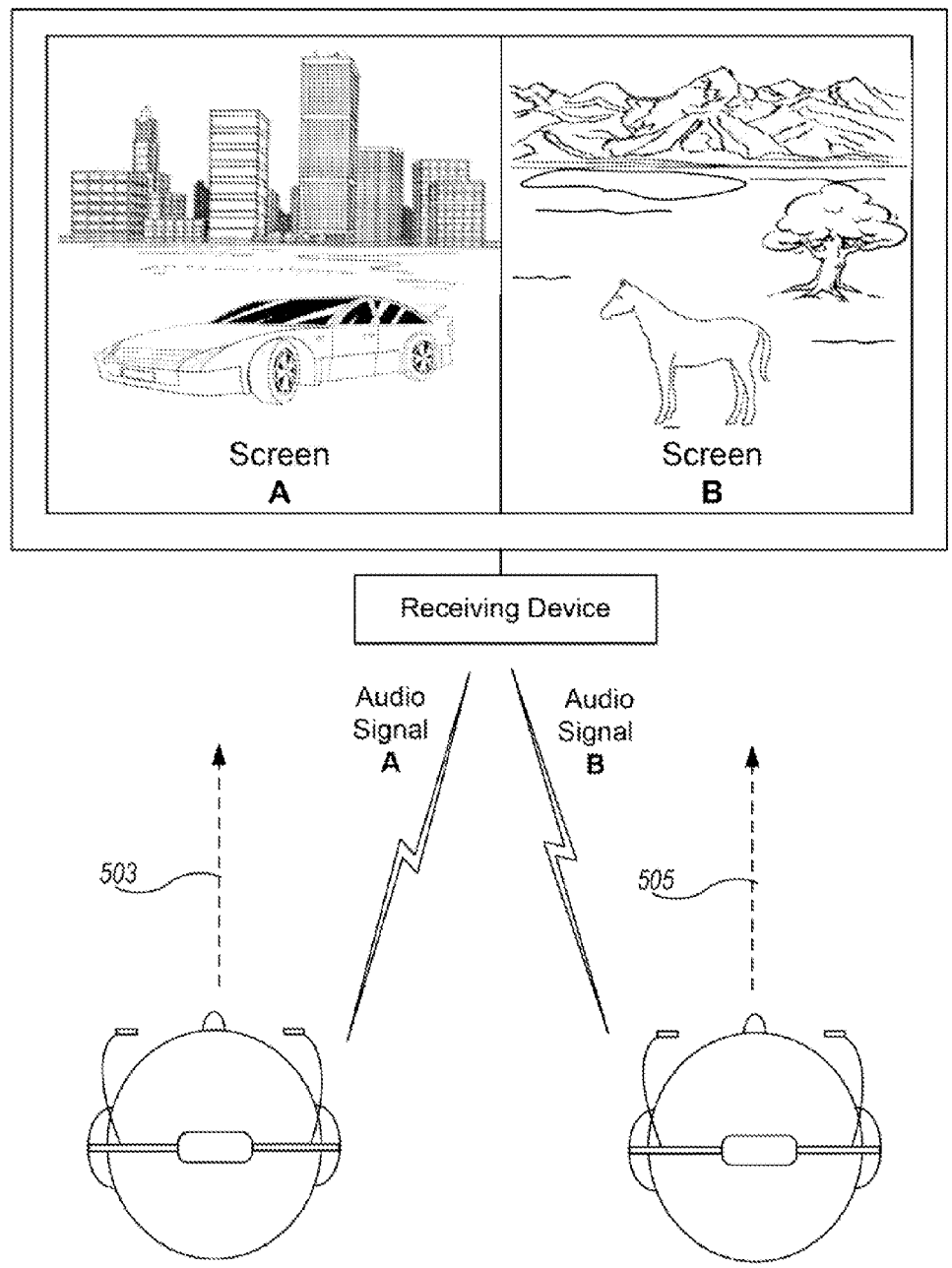
FIG. 5 is a diagram of two different programs being displayed on a display and audio signals being transmitted to different headphone devices in a system for providing audio of different programs, according to one non-limiting illustrated embodiment.

For example, FIG. 5 is a diagram of two different programs being displayed on a display and audio signals being transmitted to different headphone devices in a system for providing audio of different programs, according to one non-limiting illustrated embodiment. One user is looking in direction 503 at screen A, and thus receives the audio signal for the program being displayed on screen A. The other user is looking in direction 505 at screen B, and thus receives the audio signal for the program being displayed on screen B.

Figure 6:
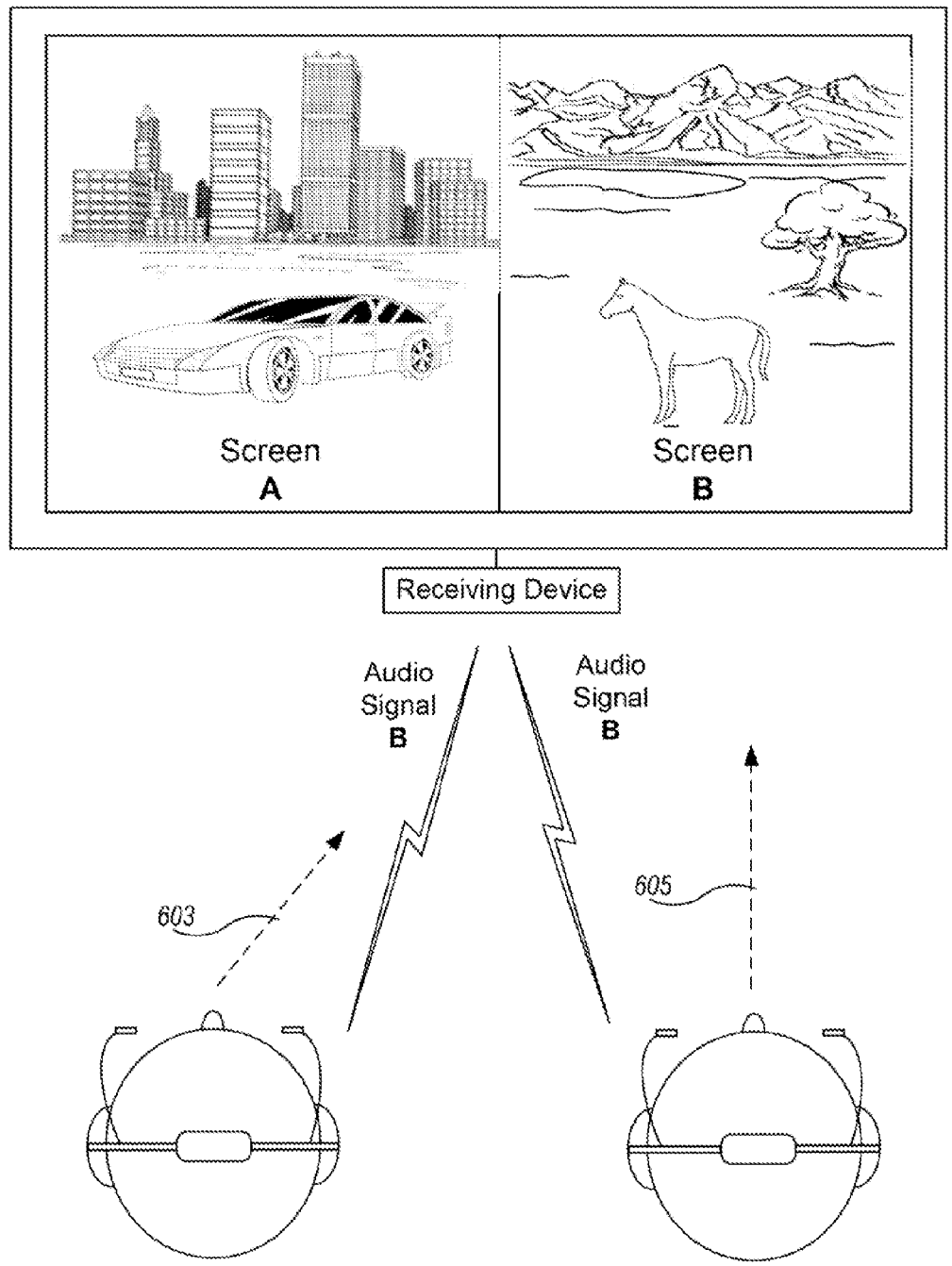
FIG. 6 is a diagram of two different programs being displayed on a display and selection of audio signals to be transmitted to headphone devices of users looking at different programs in a system for providing audio of different programs, according to one non-limiting illustrated embodiment.

FIG. 6 is a diagram of two different programs being displayed on a display and selection of audio signals to be transmitted to headphone devices of users looking at different programs in a system for providing audio of different programs, according to one non-limiting illustrated embodiment. In this example, one user is looking in direction 603 at screen B, and thus receives the audio signal for the program being displayed on screen B. The other user is also looking in direction 605 at screen B, and thus receives the audio signal for the program being displayed on screen B.

Figure 7:
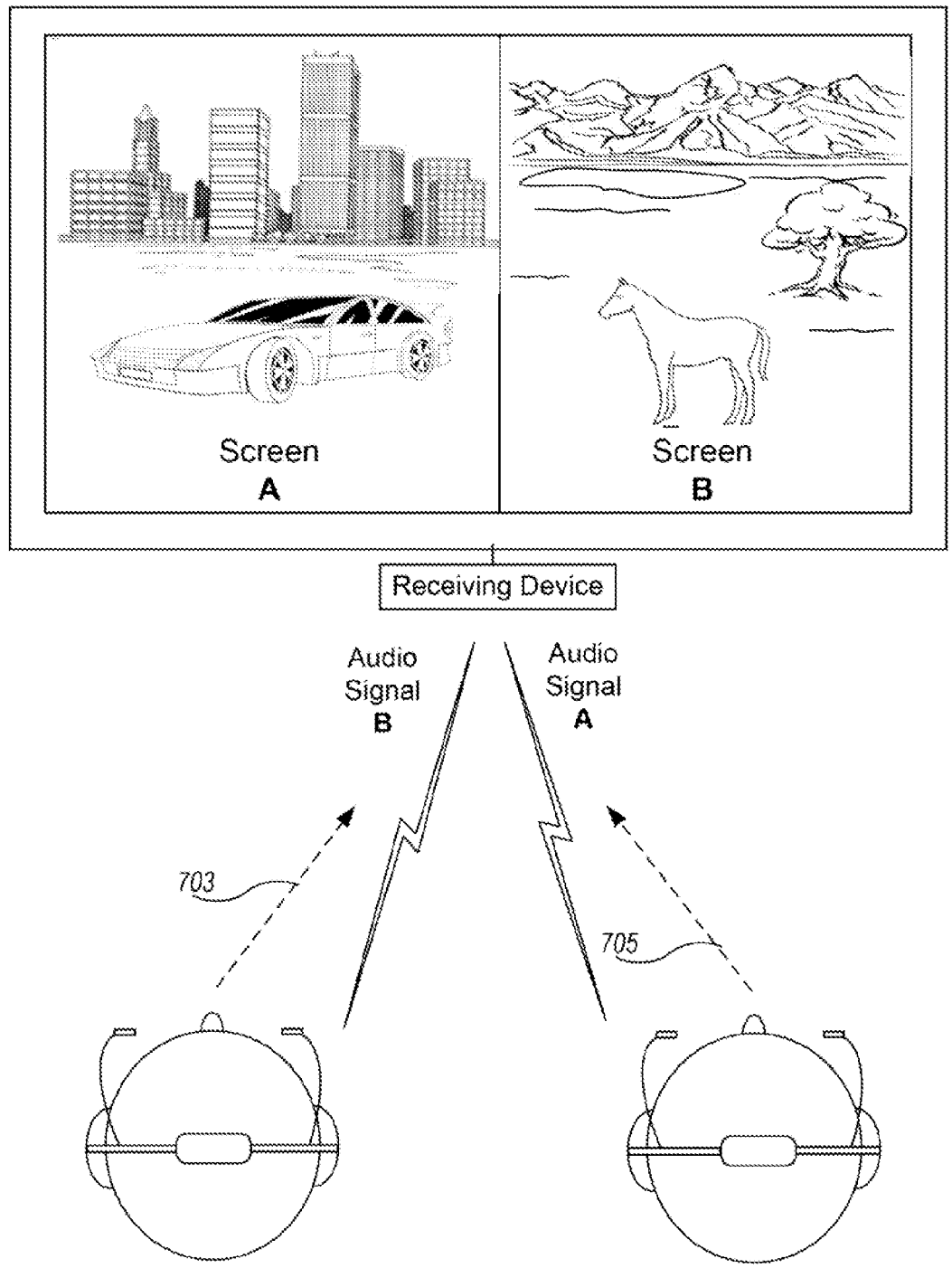
FIG. 7 is a diagram of two different programs being displayed on a display and selection of audio signals to be transmitted to headphone devices of users looking at different programs based on eye movements/positions of users in a system for providing audio of different programs, according to one non-limiting illustrated embodiment.

FIG. 7 is a diagram of two different programs being displayed on a display and selection of audio signals to be transmitted to headphone devices of users looking at different programs based on eye movements of users in a system for providing audio of different programs, according to one non-limiting illustrated embodiment. In this example, one user is looking in direction 703 at screen B, and thus receives the audio signal for the program being displayed on screen B. The other user is looking in direction 705 at screen A, and thus receives the audio signal for the program being displayed on screen A.

Figure 8:
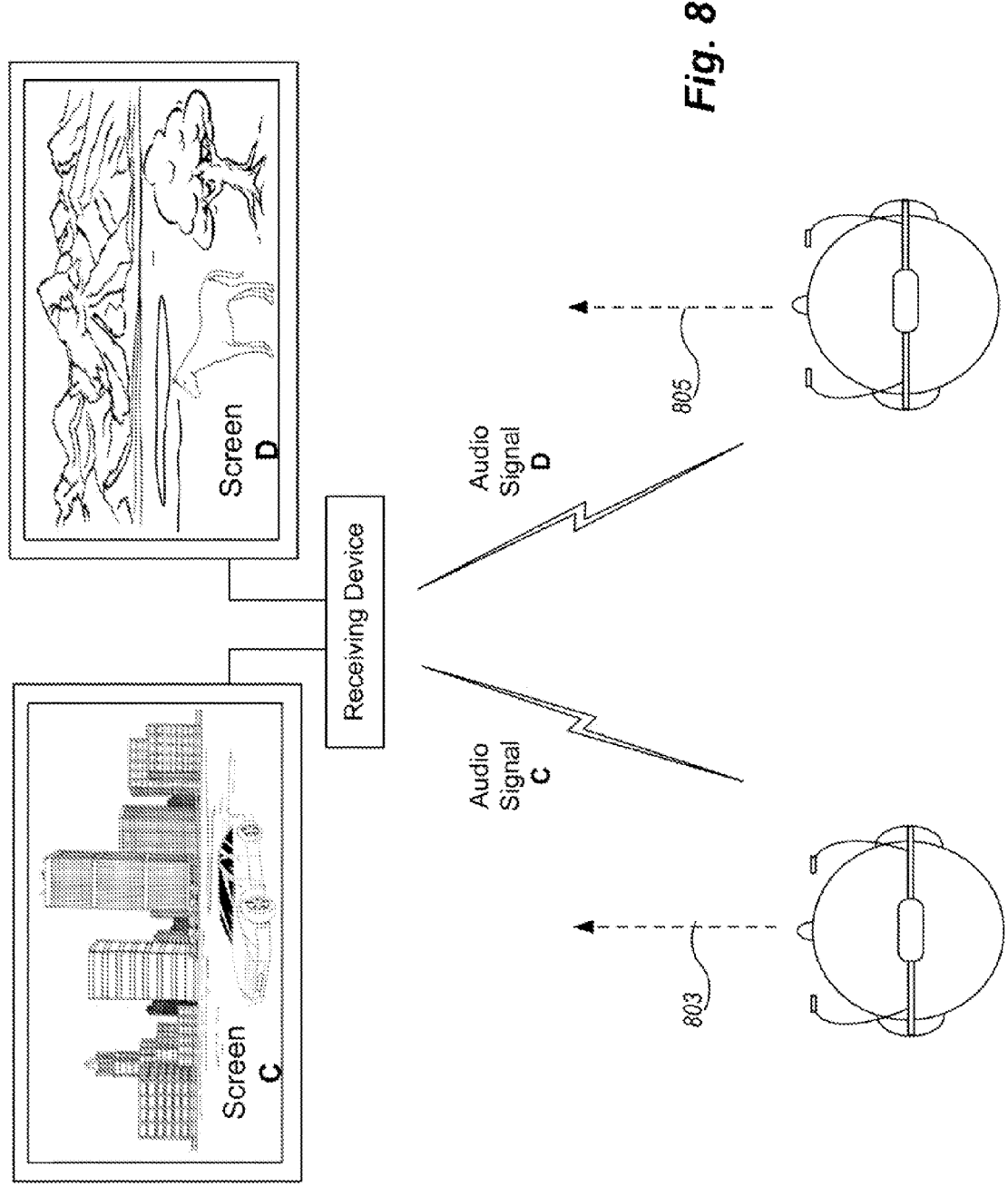
FIG. 8 is a diagram of two different programs being displayed on two different displays visible by two users and selection of audio signals to be transmitted to headphone devices of the users looking at different programs in a system for providing audio of different programs, according to one non-limiting illustrated embodiment.

FIG. 8 is a diagram of two different programs being displayed on two different displays visible by two users and selection of audio signals to be transmitted to headphone devices of the users looking at different programs in a system for providing audio of different programs, according to one non-limiting illustrated embodiment. In this example, one user is looking in direction 803 at screen C, and thus receives the audio signal for the program being displayed on screen C. The other user is looking in direction 805 at screen D, and thus receives the audio signal for the program being displayed on screen D.

Figure 9:
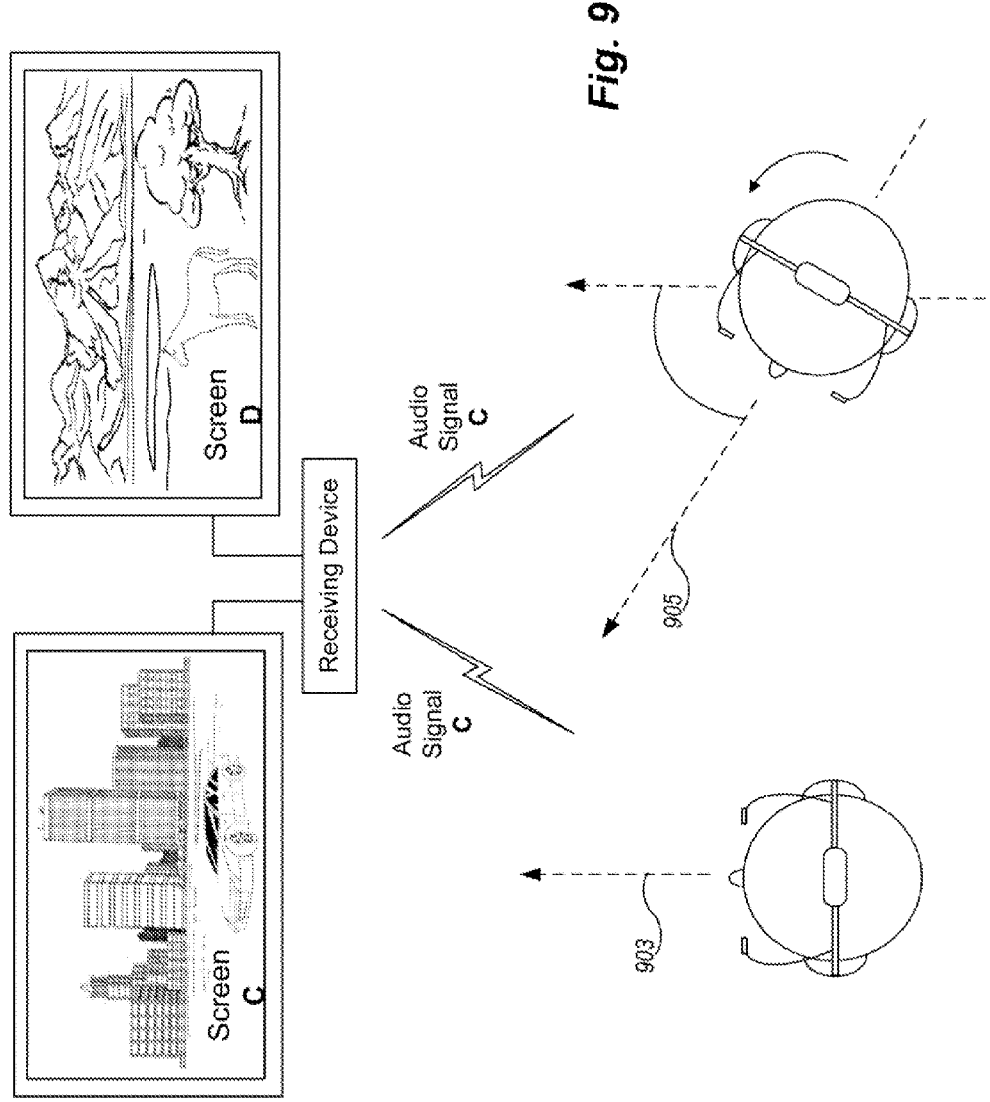
FIG. 9 is a diagram of two different programs being displayed on two different displays visible by two users and selection of audio signals to be transmitted to headphone devices of the users looking at different programs based on head movements in a system for providing audio of different programs, according to one non-limiting illustrated embodiment.

FIG. 9 is a diagram of two different programs being displayed on two different displays visible by two users and selection of audio signals to be transmitted to headphone devices of the users looking at different programs based on head movements in a system for providing audio of different programs, according to one non-limiting illustrated embodiment. In this example, one user is looking in direction 903 at screen C, and thus receives the audio signal for the program being displayed on screen C. The other user is looking in direction 905 at screen D (as detected by movement of the user's head in that direction), and thus also receives the audio signal for the program being displayed on screen C.

FIG. 10 is a diagram of two different programs being concurrently displayed on one display visible by two users and selection of audio signals to be transmitted to headphone devices of the users looking at different programs based on a camera 129 in communication with a receiving device capturing user actions in a system for providing audio of different programs, according to one non-limiting illustrated embodiment. In this example, one user is looking in direction 1003 at screen A, and thus receives the audio signal for the program being displayed on screen A. The other user is looking in direction 1005 at screen B, and thus receives the audio signal for the program being displayed on screen B.

FIG. 11 is a diagram of two different programs being concurrently displayed on one display visible by two users and selection of audio signals to be transmitted to headphone devices of the users looking at different programs based on a camera in communication with a receiving device capturing head movements in a system for providing audio of different programs, according to one non-limiting illustrated embodiment. In this example, one user is looking in direction 1103 at screen B (as detected by the camera 129 of movement of the user's head in that direction), and thus receives the audio signal for the program being displayed on screen B. The other user is looking in direction 1105 also at screen B, and thus also receives the audio signal for the program being displayed on screen B.

Figure 12:
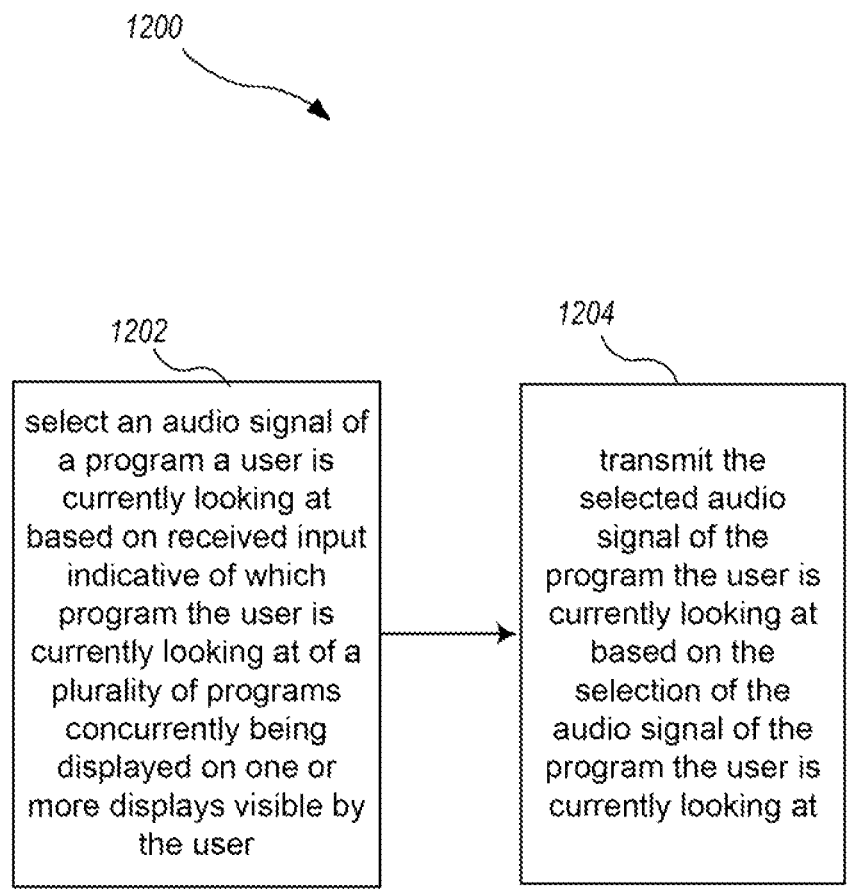
FIG. 12 is a flow diagram showing a method that may be performed by the system for providing audio of different programs, according to one non-limiting illustrated embodiment.

FIG. 12 is a flow diagram showing a method 1200 that may be performed by the system for providing audio of different programs, according to one non-limiting illustrated embodiment.

At 1202, the system selects an audio signal of a program a user is currently looking at based on received input indicative of which program the user is currently looking at of a plurality of programs concurrently being displayed on one or more displays visible by the user.

At 1204, the system transmits the selected audio signal of the program the user is currently looking at based on the selection of the audio signal of the program the user is currently looking at.

Figure 13:
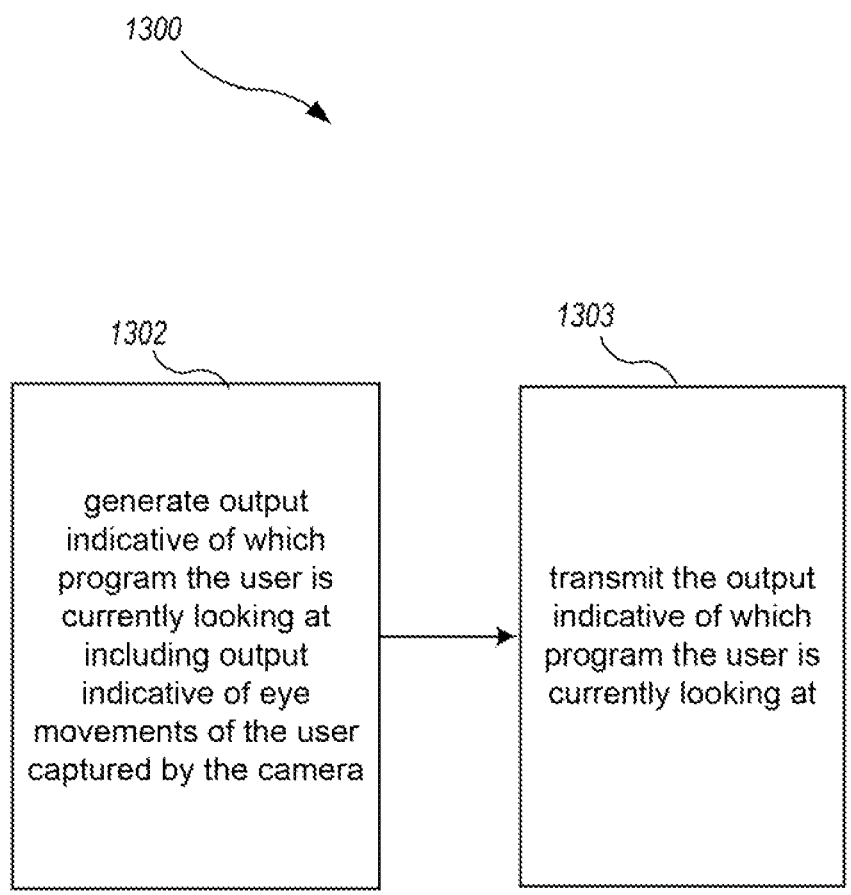
FIG. 13 is a flow diagram showing a method that may be performed by one or more headphone devices in the system for providing audio of different programs, according to one non-limiting illustrated embodiment.

FIG. 13 is a flow diagram showing a method 1300 that may be performed by one or more headphone devices in the system for providing audio of different programs, according to one non-limiting illustrated embodiment.

At 1302, the system generates output indicative of which program the user is currently looking at including output indicative of eye movements/positions of the user captured by the camera.

At 1303, the system transmits the output indicative of which program the user is currently looking at.

The system may generate, for example, using controller 203 of headphone device 124a in conjunction with cameras 127*a* and/or 129, the input indicative of which program the user of headphone device 124*a* is currently looking at of the plurality of programs concurrently being displayed on one or more displays visible by the user. This may be performed by associating a position of an eye of the user with a location on the one or more displays associated with one of the plurality of programs being displayed on the location. The system may also recalibrate when the user moves locations by associating another position of the eye of the user with the location on the one or more displays. Gestures of the user may also be used to indicate or signal which audio signal is to be selected for that user.

Figure 14:
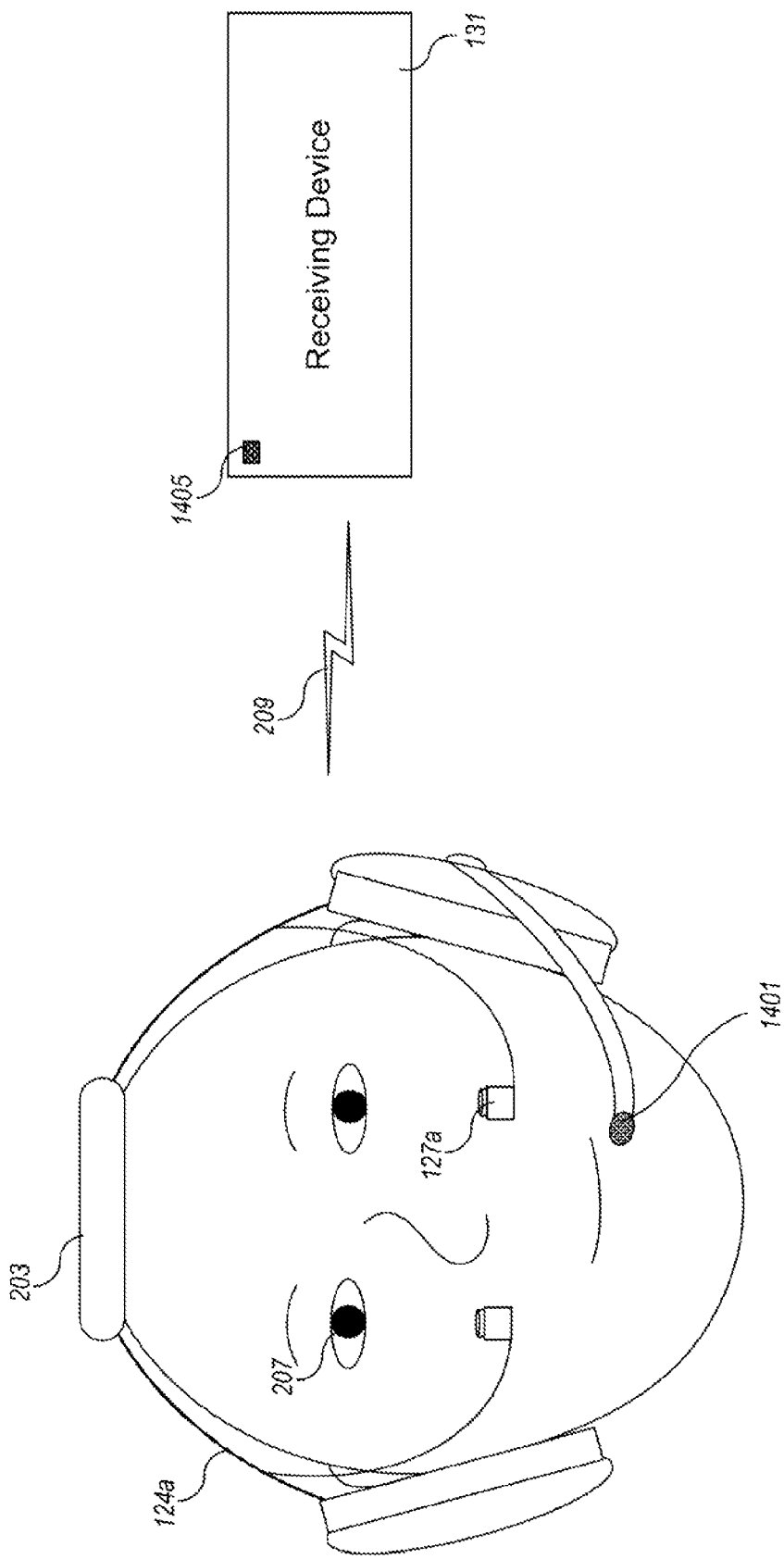
FIG. 14 is a diagram of an example headphone device with a microphone device and a receiving device in communication with the headphone device in a system for providing audio of different programs, according to one non-limiting illustrated embodiment.

FIG. 14 is a diagram of example headphone device 124*a* additionally including a microphone device 1401 and shows the receiving device 131 in communication with the headphone device 124*a* in the system for providing audio of different programs. According to another non-limiting embodiment, one or more of the headphone devices of the system for providing audio of different programs, such as headphone device 124*a* and/or 124*b*, may include a microphone device mounted on the respective headphone device in addition to or instead of a camera 127*a* or 127*b* being mounted on the respective headphone device. In this manner, voice recognition of the users' voices can also be profiled by the receiving device 131 to decipher which audio stream will be transmitted to the specific headphone device 124*a* and/or 124*b*.

In particular, an example microphone device 1401 is shown mounted on the headphone device 124*a* in FIG. 14. The microphone device 1401 is mounted and positioned on the headphone device 124*a* in a manner to detect the voice of the user wearing the headphone device 124*a* and enables the system to determine which program the user wearing headphone device 124*a* wants to hear through the headphone device 124*a*. When the user wearing headphone device 124*a* says a particular command and/or other particular utterance that is associated with a particular program and/or screen (e.g., screen A, B, C, or D shown in FIG. 1), the system will determine based on input originating from the microphone device 1401 that the user wants to switch to hearing the audio of the associated particular program. The system will then select and switch to sending the audio signal of the associated particular program to the user's headphone device 124*a*. For example, for headphone device 124*a*, this audio may be sent via the wireless signal 209 on communication link or channel 118*a* (shown in FIG. 1).

This determination and/or selection of the audio signal of the associated particular program may be performed by the controller 203 of the headphone device 124*a* that is in operable communication with the microphone device 1401. Also or instead, this determination and/or selection of the audio signal of the associated particular program may be performed by the receiving device 131 that is in communication with the controller 203 of the headphone device 124*a* and/or in direct communication with the microphone device 1401. For headphone device 124*a*, such communication may be made via the wireless signal 209 on communication link or channel 118*a* (shown in FIG. 1). For example, headphone device 124*a* has a controller 203 that may process and/or act on input signals received from the microphone device 1401 and communicate with the receiving device 131 accordingly for the system to perform the processes as described herein. Controller 203 may perform specific acts to receive, format, interpret, process and/or make decisions regarding input received from the microphone device 1401. Additionally or instead, the controller 524 (shown in FIG. 1) of the receiving device 131 may perform specific acts to cause the audio control unit 116 (shown in FIG. 1) of the receiving device 131 to receive, format, interpret, process and/or make decisions based on received input originating from the microphone device 1401 or received input otherwise regarding voice commands or other utterances of the user.

The receiving device 131 may also or instead include, or otherwise be connected to, a microphone device 1405. This may be instead of or in addition to one or more of the headphone devices being equipped with a microphone device. The microphone device 1405 may directly receive audio input from and discern the voice of one or more users, such as those wearing the headphone devices 124*a* and/or 124*b* such that the system may determine which program a particular user wearing headphone device 124*a* or 124*b* wants to hear through their respective headphone device.

The user's voice and a particular headphone device associated with a user (e.g., headphone device 124*a*) may be associated with a user profile stored on or otherwise accessible to the receiving device 131 such that the receiving device 131 may determine who spoke the command and then change the audio stream for the headphone device associated with that user profile. The controller 524 (shown in FIG. 1) of the receiving device 131, controller 203, microphone device 1401 and/or microphone device 1405 may have or otherwise utilize voice and/or speech recognition functionality to identify the user based on their voice pattern, voice characteristics, or a particular voice command, and thus may also determine the user's voice command or other utterance to be associated with a particular program and/or screen. For example, using such voice recognition functionality, the receiving device 131 may detect that a user having a profile associated with headphone device 124*a* is speaking and wants to switch to hearing the audio of a particular program, or program being displayed on a particular screen, associated with the user's voice command or other utterance. The receiving device 131 will then switch to sending the audio signal of the associated particular program to the headphone device 124*a* associated with that user profile. Also, in some embodiments, there may be a button or other input device (not shown) on the headphone device 124*a* which may be activated to send a signal to the receiving device 131 to indicate which headphone device the subsequent voice command is to be associated with.

In various embodiments, in order to provide the voice input to facilitate performance of the functions described herein of the system for providing audio of different programs, one or more microphone devices such as microphone device 1401 or 1405 may similarly also or instead be part of, or be operably connected to, other attached/networked devices. Such devices may include, but are not limited to, one or more of: camera 129, display device 103, 109 and/or 111; a mobile device; a smart phone; a tablet device; other personal computing devices; smart appliances, a speaker system, an entertainment system, a game console, a gaming device, a virtual reality system, etc.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" having computer executable instructions thereon, that when executed by a computer processor, may cause the processes and methods described herein to be performed. The "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. Aspects of the embodiments can be modified, if necessary, to employ systems, circuits and concepts of the various patents, applications and publications to provide yet further embodiments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of providing audio of different programs comprising:
    performing an initial calibration including receiving an identifier of a headphone device of a user via a signal modulated to communicate the identifier of the headphone device and assigning the headphone device to a profile of the user based on the received identifier;
    selecting, by at least one computer processor, an audio signal of a program the user is currently looking at based on received input indicative of which program the user is currently looking at of a plurality of programs concurrently being displayed on one or more displays visible by the user;
    transmitting to the headphone device, by at least one computer processor, the selected audio signal of the program the user is currently looking at based on the selection of the audio signal of the program the user is currently looking at, wherein the input indicative of which program a user is currently looking at is received from a camera device that is attached to a device that outputs the program the user is currently looking at or to one or more other devices, wherein at least one of the other devices is connected non-wirelessly to the device that outputs the program the user is currently looking at;
    generating, by at least one computer processor, the input indicative of which program the user is currently looking at of the plurality of programs concurrently being displayed on one or more displays visible by the user by at least associating a position of an eye of the user with a location on the one or more displays associated with one of the plurality of programs being displayed on the location; and
    recalibrating when the user moves locations by associating another position of the eye of the user with the location on the one or more displays.

2. The method of claim 1, further comprising causing, by at least one computer processor, the plurality of programs to be displayed on the one or more displays.

3. The method of claim 1 wherein the transmitting of the audio signal includes transmitting the audio signal wirelessly to a wireless transceiver of a headphone device.

4. The method of claim 3 wherein the headphone device is associated with the user and the one or more displays are also visible by another user, and further comprising:
    selecting, by at least one computer processor, an audio signal of a program the other user is currently looking at based on received input indicative of which program the other user is currently looking at of the plurality of programs concurrently being displayed on the one or more displays also visible by the other user; and
    wirelessly transmitting, by at least one computer processor, the selected audio signal of the program the other user is currently looking to a wireless transceiver of another headphone device associated with the other user based on the selection of the audio signal of the program the other user is currently looking at.

5. The method of claim 1 wherein the input indicative of which program a user is currently looking at of the plurality of programs concurrently being displayed on one or more displays visible by the user is based on tracking one or more of: eye movements and eye positions of the user.

6. The method of claim 5 wherein the input indicative of which program a user is currently looking at of the plurality of programs concurrently being displayed on one or more displays visible by the user is based at least in part on tracking the eye movements and eye positions of the user via a camera.

7. The method of claim 1 wherein the input indicative of which program a user is currently looking at of the plurality of programs concurrently being displayed on one or more displays visible by the user is based on tracking movements of the user.

8. The method of claim 1 wherein the input indicative of which program a user is currently looking at of the plurality of programs concurrently being displayed on one or more displays visible by the user is based at least on tracking head movements of the user.

9. The method of claim 1 wherein the input indicative of which program a user is currently looking at is received from the headphone device.

10. The method of claim 1 wherein the plurality of programs are being concurrently displayed on one display.

11. A headphone device comprising:
a headphone device member wearable by a user;
at least one speaker device physically attached to a member of the headphone device;
a control unit physically attached to the member; and
a camera physically attached to the member that is positioned and configured to track one or more of: eye positions and eye movements of a user wearing the headphone device member, wherein the control unit includes at least one processor and at least one memory, the at least one memory having computer executable instructions stored thereon, that when executed by the at least one processor, cause the controller to:
cause an initial calibration to be performed by sending an identifier of the headphone device via a signal modulated to communicate the identifier of the headphone device to cause an assignment to occur of the headphone device to a profile of the user based on the sent identifier;
generate output indicative of which program the user is currently looking at including output indicative of eye movements and eye positions of the user captured by the camera; and
transmit the output indicative of which program the user is currently looking at.

12. The headphone device of claim 11 wherein the transmitting output indicative of which program the user is currently looking at includes wirelessly transmitting the output indicative of one or more of: eye movements and eye positions of the user captured by the camera.

13. The headphone device of claim 11 wherein the transmitting output indicative of which program the user is currently looking at includes wirelessly transmitting output indicative of position of the headphone device.

14. The headphone device of claim 11 wherein the transmitting output indicative of which program the user is currently looking at includes wirelessly transmitting output indicative of location of the headphone device.

15. The headphone device of claim 11 further comprising a microphone device on the headphone device, the microphone device positioned and configured to detect at least one voice command, wherein the computer executable instructions, when executed by the at least one processor, further cause the controller to:
generate output indicative of a program, the audio of which is to be sent to the headphone device based on the detected voice command; and
transmit the output indicative of the program.

16. A non-transitory computer-readable storage medium having computer executable instructions thereon, that when executed by a computer processor, cause the following to be performed:
performing an initial calibration including receiving an identifier of a headphone device of a user via a signal modulated to communicate the identifier of the headphone device and assigning the headphone device to a profile of the user based on the received identifier;
receiving input indicative of which program the user is currently looking at of a plurality of programs concurrently being displayed on one or more displays visible by the user including input from a camera indicative of a current direction the user is looking, wherein the input indicative of which program the user is currently looking at of the plurality of programs concurrently being displayed on one or more displays visible by the user is generated by at least associating a position of an eye of the user with a location on the one or more displays associated with one of the plurality of programs being displayed on the location based on the received input from the camera indicative of the current direction the user is looking;
performing one or more of selecting of and transmitting, to the headphone device, of an audio signal of a program the user is currently looking at based on the received input indicative of which program the user is currently looking at of the plurality of programs concurrently being displayed on the one or more displays visible by the user, wherein the input indicative of which program the user is currently looking at is received from a camera non-wirelessly connected to a receiving device configured to generate the plurality of programs for display; and
recalibrating when the user moves locations by associating another position of the eye of the user with the location on the one or more displays.

17. The non-transitory computer-readable storage medium of claim 16 wherein the input from a camera indicative of a current direction the user is looking includes input indicative of one or more of: a position of the user's head, a position of the user's eyes, a direction in which the user is looking, movements of the user, movements of the user's eyes and gestures of the user.

18. The non-transitory computer-readable storage medium of claim 16 wherein the input indicative of which program the user is currently looking is based on a voice command of the user.

* * * * *